United States Patent Office 3,024,373
Patented Mar. 6, 1962

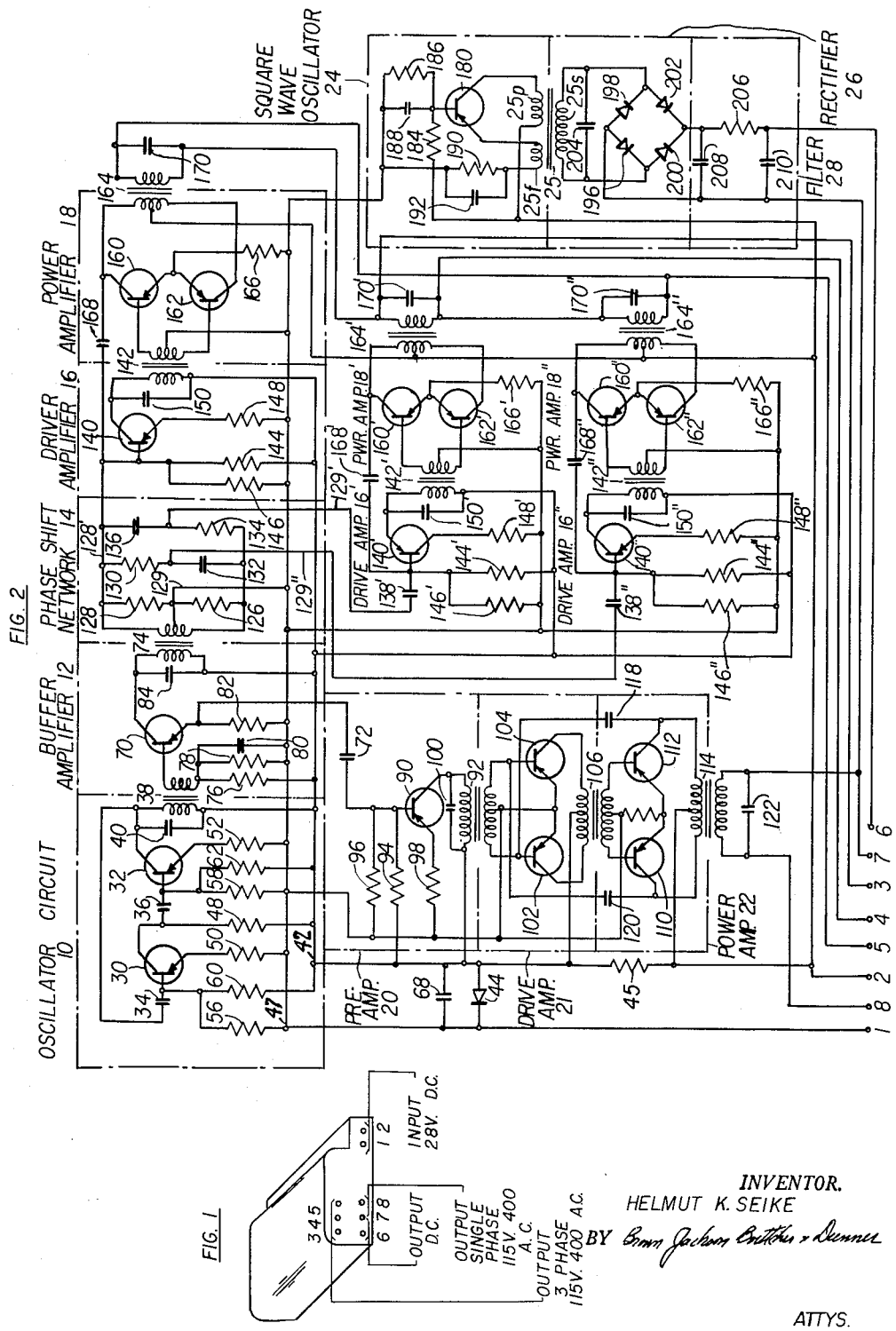

3,024,373
STATIC POWER INVERTER
Helmut K. Seike, Toledo, Ohio, assignor to Kaiser Industries Corporation, Oakland, Calif., a corporation of Nevada
Continuation of application Ser. No. 790,564, Feb. 2, 1959. This application Apr. 20, 1960, Ser. No. 23,520
11 Claims. (Cl. 307—150)

The present invention relates to a static power inverter device for simultaneously providing three-phase A.C. power, single phase A.C. power, and high voltage D.C. power from a low voltage D.C. supply source.

In certain commercial and industrial fields, there has been a known need for a small electrical power device which is capable of converting low voltage direct current into single phase and three phase alternating current energy and additionally into high voltage direct current energy. Such need is particularly great, for example, in aircraft electrical supply systems in which both single phase and three-phase A.C. energy is required for operation of various types of equipment, such as gyroscopes, and high voltage direct current is required for the control circuitry of such equipment. Manifestly, a power inverter for use in aircraft is preferably of very light weight and small size, and must be capable of reliable operation under varied and severe operating conditions.

In certain applications, rotary machinery basically comprising a motor generator set is used for such purpose. Rotary type supplies, however, have many disadvantages including large bulk and weight, a high, unpleasant noise level, low efficiency, and a relatively high frequency of breakdown due to the use of moving parts. In other applications, electronic devices including vacuum and gas tubes, in particular, have been used to convert D.C. power to single phase A.C. power, three-phase A.C. power, and to higher voltage D.C. power. The electronic devices have been successful in the elimination of many of the problems associated with rotating machinery. However, such devices are of limited usefulness in portable applications in that power supplies of three or four hundred volt potentials are required, and most known power supply means of such type are extremely cumbersome, and of relatively large size and weight. Furthermore, vacuum tubes are subject to breakage due to shock, vibration, aging and other severe operating forces, and operate at high temperatures due to their high power consumption, thereby creating the additional problem of providing adequate cooling when packaging such a unit.

It is a general object of the present invention, therefore, to provide a single compact power package of static components for converting low voltage D.C. power to single phase A.C. power; three phase A.C. power; and to high voltage D.C. power.

A further object of the present invention is to provide, in a single unit of small weight and size, means for providing single phase A.C. power, three-phase A.C. power and high voltage D.C. power from a single source which are comprised of low-distortion output waveforms under various load conditions for the different output circuits.

A novel feature of the present invention is the manner in which static devices, such as semiconductors, are used to provide in a single unit of small weight and size, circuits which produce each of the different types of power. Briefly, the present invention uses a novel combination of transistor circuits to produce from a common battery or other low voltage D.C. power source, three types of power outputs which may be loaded independently of each other. The three-phase A.C. power is provided by a circuit comprising means to produce a low power sine wave, phase-shifting means to split the low power sine wave into three A.C. signals, each 120° out of phase with the others, and means for amplifying each of the three A.C. signals to produce a three-phase A.C. power signal output. An isolation transformer is used in the amplifying stages to isolate the three phase and single phase A.C. power, the single phase A.C. power being provided by an amplifier circuit coupled to the common low power sine wave producing means. The high voltage D.C. power is in turn isolated from the A.C. power by means for producing a square wave signal, transformer means which increase the voltage of the square wave signal, and means which rectify the square wave to produce a high voltage D.C. potential. Thus, in achieving an object of the invention, a static inverter is provided in which three different forms of electrical power are provided independent of one another, and a load variation on one does not introduce fluctuations in the other. By using transistor circuits and other static components to provide these output signals, all three types of inverters may be joined into one small, light weight, compact unit, thereby providing portable means for supplying the type of power required without the use of moving or shock susceptible parts.

These and other features of the present invention will become apparent with reference to the following specification, claims, and drawing in which:

FIGURE 1 is a perspective view of one embodiment of the novel static device; and FIGURE 2 is a schematic diagram of the novel circuitry of such device.

GENERAL CIRCUIT DESCRIPTION

With reference to FIGURE 1, the novel device of the present invention is housed in a compact package which in one embodiment may be contained in a housing approximately nine inches by six inches by three inches. Exteriorly, the housing mounts input terminals 1 and 2 for coupling the unit to a low voltage direct current power source, such as a 28 volt D.C. source, and three sets of output terminals 3—8 for providing three different types of power for associated equipment. Briefly, terminals 3, 4 and 5 are connected to provide three-phase alternating current of 115 volts, 400 c.p.s.; terminals 6 and 7 are connected to provide a direct current output of 200 volts, and terminals 7 and 8 are connected to provide a single-phase, alternating current output of 115 volts, 400 c.p.s. The entire device is comprised of static devices (no moving parts, gas or vacuum tubes) to provide a power source of increased reliability, and particularly of improved performance when used in equipment in which severe shock and acceleration forces are experienced.

The novel circuit for achieving such results basically comprises a transistorized oscillator circuit 10 which is coupled to the D.C. low-voltage power source input terminals 1, 2 to provide a sine wave output signal, a buffer amplifier circuit 12 coupled to the output side of oscillator circuit 10 to amplify the sine wave output signals 10, a phase shift network 14 coupled to the output of the amplifier circuit 12 to produce three separate sine wave signal outputs, each of which is 120° out of phase with the others, and an amplifying means comprising a driver amplifier circuit, such as 16, 16', 16'', and a power amplifier circuit, such as 18, 18', 18'', coupled to each of the separate outputs of the phase shift network 14 to amplify each of the three sine waves to the desired level. The driver amplifiers 16, 16', 16'' and the power amplifiers 18, 18', 18'' provide equal amplification of each of the three sine wave signals, and couple the three sine wave signals across the output terminals 3, 4, 5 where they may be coupled to a load requiring three phase A.C. power.

The circuitry also includes a preamplifier circuit 20, a driver amplifier circuit 21, and a power amplifier circuit, connected to each other and the output side of the buffer amplifier 12 to amplify the sine wave signals to the desired level for coupling to output terminals 7, 8.

A square wave oscillator circuit 24 is coupled to the power source 1, 2 and provides a high-frequency, high power, low voltage square wave signal output. A step-up transformer 25 coupled to the square wave oscillator 24 increases the voltage of the square wave signal to provide a high-voltage signal to a rectifier circuit 26, which rectifies the square wave signal to produce a high-power, high-voltage D.C. signal with a superimposed high-frequency A.C. ripple. Filter network 28 coupled to the rectifier circuit 26 filters out the high-frequency ripple to provide a high-power, high-voltage D.C. output signal for coupling to output terminals 6, 7 for use by associated equipment.

SPECIFIC CIRCUIT DESCRIPTION

Referring to FIGURE 2, the circuit of one compact, reliable device for providing three separate power sources from a low voltage D.C. source is shown in detail. As there shown, the static inverter includes an input terminal 1, 2 for coupling the static inverter device to a 28 volt D.C. potential source.

A voltage regulation circuit comprised of resistor 45, Zener diode 44, and capacitor 68 is connected to the input terminals 1, 2, and the diode provides a substantially constant voltage supply to the positive supply conductor 47 and the negative supply conductor 42 for the device. The capacitor 68 protects the device from damage by peak conditions.

An oscillator circuit 10 is connected over to the supply conductors 42, 47 and is operative to provide a low power A.C. sine wave signal output to a buffer amplifier circuit 12. Oscillator circuit 10 basically comprises a first and second PNP transistor 30, 32, each comprising a base electrode, a collector electrode, and an emitter electrode. Transistors 30, 32 are connected in a circuit comparable to a tuned collector oscillator of the Franklin type to produce a sine wave output signal. The collector of transistor 30, is connected over a capacitor 36 to the base of transistor 32, and the collector of transistor 32 is connected over a capacitor 34 to the base of transistor 30. A tuned coupling transformer 38 is connected to couple the sine wave output signals to buffer amplifier 12. That is, the collector of the second transistor 32 is loaded by a parallel tuned circuit, comprising the primary winding of transformer 38 and a parallel-connected capacitor 40. The tuned circuit is, in turn, connected to the negative supply conductor 42.

The primary winding of the transformer 38 thus serves as a low resistance D.C. path from the negative supply conductor 42 to the collector of transistor 32. The collector of transistor 30 is connected over resistor 48 to the negative supply conductor 42. The emitters of transistors 30, 32 are each connected through a current feedback resistor such as 50, 52, respectively, to the positive supply conductor 47. The base of transistor 30 is biassed by a voltage divider comprising a pair of resistors 56, 60 which are coupled to the positive supply conductor 47 and the negative supply conductor 42, respectively, and the base of transistor 32 is biassed by two resistors 58, 62 which are respectively connected to positive supply conductor 47 and the negative supply conductor 42.

It is apparent that any oscillation in the tuned circuit for the oscillator circuit 10 will be coupled over capacitor 34 to the base of transistor 30 for amplification. The amplified output signal which appears at the collector of transistor 30 is coupled over capacitor 36 to the base of transistor 32. The signal, as amplified, is coupled across the tuned circuit which is connected in the collector circuit of transistor 32. Such signal is positive and in phase with the original signal, and will therefore reinforce the original signal, causing increased current flow over primary winding 38a. The increasing signal is coupled back over the base-emitter circuit of transistor 30 to effect increased conductivity thereof, which in turn effects an increased signal output and an increase in the conductivity thereof, to thereby effect increased signal current flow in the tuned circuit. In this manner, the output signal to the oscillator 10 is progressively increased until such time as the transistor 32 is driven to the saturation state, at which time current flow becomes constant and no further voltage is induced across the primary winding.

Capacitor 40 now starts to discharge through the primary winding, and the resultant signal is coupled to transistors 30, 32 to decrease the transistor conductivity and the emitter current thereof. The decrease of the emitter current of transistor 32 induces a voltage of a reversed polarity therein, and the base emitter circuits are driven to cut off. At this time capacitor 40, which has been charged negatively, discharges, and the base emitter circuits of transistors 30, 32 are biassed to the point of conductivity, whereby the emitter current begins to flow and the cycle is re-initiated. Temperature stabilization for 30 and 32 is obtained by the use of relatively high feedback resistors in both emitters which will cause an opposite polarity to both bases and compensate therefor. The frequency of these oscillations may be determined by standard methods known to those skilled in the art and may be fixed at any desired value by designing the parameters of the tuned circuit.

The energizing potential for the transistors 30, 32 is stabilized by the Zener diode 44 which is back-biassed to its voltage saturation level. Saturation of the diode provides constant value voltage to the positive supply conductor 47 and the negative supply conductor 42 over a wide range of current requirements. Capacitor 68 protects the Zener diode 44 against high peak currents.

Thus the oscillator circuit 10 produces a low power, constant frequency, low distortion sine wave which is substantially independent of fluctuations in the voltage provided by the power source. The sine wave output of the oscillator circuit 10 which appears across the primary winding of the coupling transformer 38 is coupled over the secondary winding to the buffer amplifier 12.

The buffer amplifier circuit 12 is connected between the output side of the sine wave oscillator circuit 10 and the input circuit for phase shift network 14 and also to the preamplifier circuit 20 for the purpose of amplifying the sine wave output signal of the oscillator circuit 10 prior to coupling thereof to both the three-phase power generating means and the single phase power generating means of the device. The buffer amplifier circuit 12 further provides isolation between the oscillator circuit 10 and the amplifying circuits for the single and three phase supplies to protect the oscillator 10 from distortion and frequency drift with the heavy loading of the amplifiers in the subsequent stages.

The buffer amplifier circuit 12 comprises a transistor 70, having a base electrode, a collector electrode, and an emitter electrode, connected in an amplifier circuit (class A) to provide output signals over a coupling capacitor 72 to the preamplifier circuit 20 for the single phase output, and over a coupling transformer 74, having a primary and a secondary winding, to the phase shift network 14.

The base of transistor 70 is coupled over the secondary winding of the coupling transformer 38 to a voltage divider comprised of a resistor 76 connected to the negative supply conductor 42 and a resistor 78 connected to the positive supply conductor 47. Capacitor 80 is coupled across resistor 78. The emitter of transistor 70 is coupled over current feedback resistor 82 to the positive supply conductor 47 and the collector of transistor 70 is coupled to the negative supply conductor 42 over a tuned circuit comprised of the primary winding of the coupling transformer 74 and a capacitor 84 which is coupled across the primary winding.

The input signals coupled to the base of transistor 70 by the oscillator circuit 10 are amplified and inverted, and coupled over transformer 74 to the phase shift network 14. Since the collector current of a transistor is the sum of its base current and its emitter current, the current through the emitter and its current feedback resistor 82 is also dependent upon the input signal from the oscillator circuit 10. The input-dependent emitter current causes an input-dependent voltage drop across current feedback resistor 82 which is coupled over capacitor 72 to the single phase generating means to avoid loading of the emitter circuit of transistor 70. Thus, the buffer amplifying circuit 12 provides isolation for the oscillator circuit 10 from any heavy loading of the amplifying circuits by either single or three-phase A.C. loads, and the frequency of oscillation of the oscillator circuit 10 is stable, and independent of the loading of the static inverter.

Phase shift network 14 is connected between the buffer amplifier circuit 12 and the three driver amplifiers 16, 16', 16'' to split the sine wave signal output of the buffer amplifier 12 into three sine wave signals, each being 120° out of phase with the others, for coupling to the driver amplifiers 16, 16', 16''. The phase shift network 14 comprises a phase stabilization section, a first phase generating section consisting of a center tapped winding, a second and a third phase generating section comprised of two R-C circuits including a resistor 134 and a capacitor 136, and a resistor 130 and a capacitor 132, respectively, coupled in a phase splitting circuit to provide three sine wave output signals in response to a single sine wave input signal from the buffer amplifier 12.

More specifically, the phase stabilization section comprises resistors 126, 128 which are serially coupled across the secondary winding of transformer 74 and the junction of which is coupled to the center tap of transformer 74 and also to the positive supply conductor 47. Conductor 128' is coupled from the opposite end of resistor 128 to the drive amplifier 16.

The phase shifting network is a relatively high impedance device and a slight change of the load, represented by the input impedances of transistors 140, 140', and 140'' respectively (which in a grounded emitter configuration do not have a high input impedance) would cause an undesired drift of the phase angles. Accordingly, the source resistance for the stage is made low ohmic in value and resistors R126, R128 are made smaller in value than those of the inputs of the transistors in the subsequent stages. Thus, reflected back changes are negligible with respect to phase angles, and phase angle shift is prevented thereby.

The resistor 134 and capacitor 136 for the second phase are also serially coupled across the output of the transformer secondary, and the junction of resistor 134 and capacitor 136 is connected over coupling capacitor 138' to the drive amplifier 16' for the second phase. The resistor 130 and capacitor 132 for the third phase are also serially connected across the secondary winding of transformer 74, and the junction thereof is connected over coupling capacitor 138'' to drive amplifier 16'' for the third phase.

Thus, with the illustrated arrangement the wave form of the first phase is coupled over conductors 128', 129 to the first drive amplifier 16, the wave form output of the second phase (which is displaced from the first phase by 120°) is coupled over conductors 129', 129 to the drive amplifier 16' and the waveform of the third phase (displaced 120° from the first phase in a direction opposite to the displacement of the second phase from the first phase) is coupled over conductor 129, 129'' to the third drive amplifier 16''.

Drive amplifier circuits 16, 16', 16'' are connected between the phase shift network 14 and the power amplifier circuits 18, 18', 18'', respectively to amplify the different ones of the sine wave output signals of the phase shift network 14 which are coupled thereto, and to provide isolation of the power amplifiers 18, 18', 18'' from the components of the single phase A.C. generating means. Additionally, the driver amplifiers 16, 16', 16'' protect the phase shift network 14 from heavy or unbalanced loads, and particularly prevent such loads from producing fluctuations in the phase angles between the three sine wave signals.

The drive amplifier circuit 16 basically comprises a transistor 140, operating class A having a base electrode, a collector electrode, and an emitter electrode connected in a common-emitter amplifier circuit to amplify the signal output of the phase shift network 14 and to couple the amplified signal over a coupling transformer 142 to the power amplifier circuit 18. Briefly, the base electrode of transistor 140 is coupled over conductor 128' to the first section of phase shift network 14 to receive the output signals thereof, and is biassed by a voltage divider comprising a resistor 144 connected to the negative supply conductor 42, and a second resistor 146 connected to the positive supply conductor 47. The emitter of transistor 140 is coupled over a current feed-back resistor 148 to the positive supply conductor 47, and the collector of transformer 140 is connected over a tuned circuit, which includes capacitor 150 and the primary winding of transformer 142, to the negative supply conductor 42.

The sine wave output of the first section of phase shift network 14 is coupled to the base of transistor 140 which operates to provide an amplified sine wave output over the collector electrode and the coupling transformer 142 to the interconnected power amplifier circuit 18. Capacitor 150 reduces any distortion in the output signal which might be introduced by transistor 140. Drive amplifier units 16', 16'' are similar to unit 16 and the operation thereof will be obvious from the foregoing description.

The power amplifier circuits 18, 18', 18'' are connected between the drive amplifier circuits 16, 16', 16'' and output terminals 3, 4, 5 to provide a three-phase A.C. power signal output which may be coupled over the output terminals to a load (not shown) in response to the application thereto of sine wave signals by the drive amplifiers 16, 16', 16''.

The power amplifier circuit 18 basically comprises a pair of transistors 160, 162, each having a base electrode, a collector electrode, and an emitter electrode connected in a push-pull amplifier arrangement, and driven by the sine wave signals of the driver amplifier circuit 16 coupled over the coupling transformer 142. The output of the power amplifier 18 is coupled to the primary winding of an interconnected output transformer 164. The base electrodes of transistors 160, 162 are coupled to the secondary winding of the coupling transformer 142, the center tap of which is connected to the positive supply conductor 47. The emitters are connected together and the common point therefor is coupled over current feedback resistor 166 to the positive supply conductor 47. The collectors are connected to the primary winding of the output transformer 164, the center tap thereon being connected to the negative potential terminal 2. The collector of transistor 160 is further coupled over capacitor 168 to the base of transistor 140 of the drive amplifier 16 to provide negative feedback for stabilization of the amplifying circuits 16, 18. The use of a class B, push-pull circuit in the power amplifiers 18 results in a greater output power and a higher efficiency of operation.

The three secondary windings of transformers 164, 164', 164'' are connected together in a delta connection, and the output taps 3, 4, 5 are connected to the three common connecting points of the delta-connected secondary windings. Capacitors 170, 170', 170'' respectively are coupled across the secondary windings of the transformers 164, 164', 164''. In an alternative embodiment, a star connection is used.

In operation, as the output sine wave of a drive amplifier 16 is coupled to the base-emitter circuits of the transistors 160, 162 of the interconnected one of the power amplifiers 18, the center-tapped coupling transformer 142 provides the usual out-of-phase signals for operating the transistor pair 160, 162 in a push-pull manner. The collectors, which are loaded by the output transformer 164, provides a power signal output, and a negative feedback signal is coupled over capacitor 168 to the base electrodes to improve the gain stability and linearity of circuit operation, and to eliminate distortion in the output waveform. Resistor 166 prevents thermal run-away.

The sine wave power output signals of the power amplifiers 18, 18', 18'' are coupled over the secondary windings of transformers 170, 170', 170'' to the output terminals 3, 4, 5, such signals being of equal power and amplitude, and 120° out of phase with each other to provide normal three-phase, three (or four) wire A.C. power. The capacitors 170, 170', 170'' are used to filter out any high frequency distortion which may be introduced in the output waveform due to typical class B operation. The output transformers 164, 164', 164'' may, of course, be selected to step up the voltage level of the output signal to any desired level.

As noted above, the output of the oscillator circuit 10 and the buffer amplifier 12 is also coupled over capacitor 72 to the single phase A.C. power generating means which may comprise a preamplifier circuit 20, a driver amplifier circuit 21, and a power amplifier circuit 22, coupled to output terminals 7, 8.

Preamplifier circuit 20 is connected between buffer amplifier circuit 12 and drive amplifier circuit 21 to amplify the sine-wave signal output of the buffer amplifier circuit 12 prior to coupling thereof to drive amplifier circuit 21. Further, the preamplifier circuit 20 is used to provide very light loading of the buffer amplifier 12, thereby providing isolation between the single phase A.C. power conversion stage and the three-phase A.C. power conversion stage, so that the loading of the single phase conversion stage does not introduce any distortion in the signal of the buffer amplifier 12 to the phase shift network 14. The preamplifier circuit 20 basically comprises a transistor 90, having a base electrode, an emitter electrode, and a collector electrode connected in a common-emitter amplifier circuit to provide an output signal over a transformer 92 to the drive amplifier circuit 21 in response to a signal from the buffer amplifier circuit 12.

Briefly, the base of transistor 90 in addition to being coupled over the capacitor 72 to the emitter of transistor 70 of the buffer amplifier 12 to receive output sine wave signals, is also coupled to biasing arrangement comprising two resistors 94, 96, coupled to the negative supply conductor 42 and the positive supply conductor 47, respectively. The emitter of transistor 90 is coupled over a current feedback resistor 98 to the positive supply conductor 47, and the collector is connected over the primary winding of transistor 92 to the negative supply conductor 42. A capacitor 100 is coupled across the primary winding in the collector circuit.

In operation, input sine wave signals coupled from the buffer amplifier 12 to the base of transistor 90 are amplified by the transistor, and the amplified sine wave is coupled over coupling transformer 92 to drive the drive amplifier circuit 21. Capacitor 100 reduces any distortion in the sine wave output signal which may have been introduced by transistor 90.

The driver amplifier circuit 21 and power amplifier circuit 22 are connected in a chain between the preamplifier circuit 20 and the output terminals 7, 8 to provide a sine wave power signal output which may be coupled over output terminals to a load (not shown) in response to the application thereto of a sine wave signal from preamplifier circuit 20.

The driver amplifier circuit 21 comprises a pair of transistors 102, 104, each having a collector electrode, a base electrode, and an emitter electrode connected in a class B, push-pull amplifier arrangement, and driven by the output of the preamplifier circuit 20 which is coupled over the coupling transformer 92 to provide an amplified sine wave output across the primary winding of a coupling transformer 106. The bases of transistor 102, 104 are connected to opposite ends of the secondary winding of the first coupling transformer 92 to receive signals therefrom, and a center tap on the secondary winding is connected to the positive supply conductor 47. The emitters of transistors 102, 104 are coupled together and the common point connected to positive supply conductor 47. The collectors of transistors 102, 104 are connected to opposite ends of the primary winding of the second coupling transformer 106, a center tap thereon being connected to the negative supply conductor 42.

The power amplifier circuit 22 comprises a pair of power transistors 110, 112, each having a base electrode, a collector electrode, and an emitter electrode, connected in a class B, push-pull amplifier arrangement, and driven by the sine wave signals of the driver amplifier 21 as coupled over the secondary winding of coupling transformer 106 to provide a power sine wave output signal across the primary winding of an output transformer 114. The bases of transistors 110, 112 are coupled over the secondary winding of the second coupling transformer 106 to the positive supply conductor 47, and the emitters are coupled over a current feedback resistor 116 to the positive supply conductor 47. The collectors are connected to the primary winding of the output transformer 114, a center tap thereon being connected to the negative potential terminal 2. The collectors of transistor 110, 112 are respectively coupled over capacitor 120, 118 of the bases of transistors 104, 102' of the driver amplifier circuit 21 to stabilize the amplifying circuits 21, 22 by providing negative feedback loops therefor. The secondary winding of the output transformer 114 is coupled to output terminals 7, 8, capacitor 122 being coupled across the secondary winding to minimize signal distortion.

As the sine wave output of the preamplifier circuit 20 is coupled to the base-emitter circuits of the transistors 102, 104 of the driver amplifier 21, the center-tapped first coupling transformer 106 provides out-of-phase signals for operating the transistor pair 102, 104 in a push-pull manner. The collectors of the transistor power 102, 104 are loaded by the second coupling transformer 106, and the amplified sine wave output of the collectors is coupled thereby to the bases of transistors 110, 112 of the power amplifier circuit 22. The secondary winding of the second coupling transformer 106 is also center tapped to provide the out-of-phase signals required for push-pull operation of the power transistors 110, 112.

The collectors of power transistors 110, 112 are loaded by the output transformer 114 and provide a power signal output. The push-pull class B operation of both the driver amplifier 21 and the power amplifier 22 results in a greater power output and a higher efficiency than would be normally experienced with a single transistor circuit. The negative feedback loops between the amplifying circuits 21, 22 improve the gain stability and linearity of circuit operation and eliminate distortion in the output waveform signals.

The novel static inverter further includes high voltage D.C. power for providing 200 volt D.C. signals over output terminals 6, 7. More specifically, the input terminals 1, 2 couple power over positive and negative conductors 42, 47 to a signal generating arrangement including a square wave oscillator circuit 24, a step up transformer 25, a rectifier circuit 26 and a filter circuit 28.

The square wave oscillator circuit 24 comprises a transistor 180, having a base electrode, a collector electrode, and an emitter electrode connected in a self-oscillating arrangement to generate and couple a high-frequency square wave output to the primary winding 25′ of transformer 25.

The base of transformer 180 is coupled to a voltage divider comprising a resistor 184 connected to the negative supply terminal 2, and a resistor 186 connected to the positive supply conductor 47. The second resistor 186 is by-passed by a capacitor 188. The emitter of transformer 180 is coupled over a feedback coil 25f on transformer 25 in series with the parallel combination of a resistor 190 and a capacitor 192 to the positive supply conductor 47, and the collector of transistor 180 is coupled over the primary winding 25p to the negative potenial terminal 2.

The primary winding 25p and feedback coil 25f are coupled to a common flux path in the step-up transformer 25, so that any signal in the primary winding of the step-up transformer 25 results in the provision of a signal in the feedback coil 25f.

The operation of the square wave oscillator circuit is known in the art and is only briefly set forth hereat. More specifically, as operating potential is coupled over resistors 184, 186 to the base circuit of transistor 180, and transistor 180 is driven to saturation, a linearly increasing current flows in the transformer primary winding due to an approximate constant voltage impressed across the primary winding by the supply source. The primary voltage induces a similarly constant voltage across the feedback winding which is coupled to the base circuit to restrict the base current flow to a maximum value as determined by the value of the external base resistor 190 and the transistor direct current input resistances 184, 186.

During the period of saturation of the transistor, the collector current increases in value until it reaches the maximum value which can be supplied by the maximum base current. At this point the transistor begins to move out of saturation causing a reduction in the voltage in the primary and feedback windings.

The collector current time rate of change decreases, the voltages of the primary feedback and secondary windings reverse, and the transistor is biased to cutoff. Thus the transistor 180 acts as an on-off switch to couple energy over the secondary winding 25s to the rectifier circuit 26.

The core utilized for the transformer 25 preferably has a rectangular hysteresis characteristic and is of a construction which saturates readily. Capacitor 192 is a bypass capacitor which permits the flyback of the alternating current induced in the feedback winding to the plus conductor 47.

Thus the transistor 180 is driven alternately to its saturation state and to its cut-off state, causing the oscillator 24 to produce a square wave low voltage output signal across the secondary of transformer 25, which is operative to step up the voltage of the signal to the desired level. An oscillator of the square wave type is used because a square wave signal is most efficient and produces lowest thermal dissipation of transistor 180. High frequency is used to provide simplified filtering of the output.

The transistor 180 should be a power transistor, to eliminate the necessity of amplifying stages in the D.C. supply means. Since such a power transistor will produce self-oscillations, and since frequency stability and a low distortion output signal from the oscillator 24 are not required, the use of a power transistor does not detrimentally affect the operation of the D.C. generating means. Further, the provision of a separate oscillator for the D.C. generating means isolates the output from any distortion effects due to the loading of the A.C. generating means.

The rectifier circuit 26 is connected between the step-up transformer 25 and the filter circuit 28 to rectify the A.C. square wave signal output of the square wave oscillator circuit 24 and step-up transformer 25.

The rectifier circuit 26 comprises a set of four diodes 196, 198, 200, 202 connected in a bridge rectifying circuit to be driven by the signal output of the step-up transformer 25. Briefly, the cathodes of diodes 196, 198 are each connected to the anodes of diodes 200, 202, respectively, and to opposite ends of the secondary winding of transformer 25 to receive the output square wave which appears thereacross. The anodes of diodes 196, 198 are connected together and the cathodes of diodes 200, 202 are connected together, the common point of the respective connections being coupled over the filter circuit 28 to the output terminals 6 and 7. The square wave input signal to the rectifier 26 from the step-up transformer 25 is rectified in accordance with known rectifier operations to produce a positive D.C. output signal across terminals 6, 7.

Bridge rectifier 26 provides an output D.C. voltage which is twice as great as that which would be provided by a conventional full-wave rectifier. Further, it eliminates the necessity of a center-tap on secondary winding of the step-up transformer 25 which would be required by a conventional rectifier circuit. The diodes 196, 198, 200, 202 are of the silicon type to provide thermal stability in the circuit.

Filter circuit 28 is operative to minimize the ripple in the output signal of the rectifier 26 which is caused by the switching of the square wave signal of the oscillator circuit 24 from the positive to the negative halves of the signal, and basically comprises a resistor 206 and two capacitors 208, 210 connected in a capacitance input pi-type filter circuit to the rectifier output. The capacitors 208, 210 which are connected across the terminals 6, 7 on either side of resistor 201 offer a very high resistance to the D.C. power signal, but a low impedance path to the A.C. ripple signal. Therefore, the A.C. ripple signal is shunted through the capacitors 208, 219, and does not appear across the output terminals 6, 7 while the D.C. signal which is not shunted through the capacitors 208, 210, and appears across terminals 6, 7. The capacitance input pi-type filter provides a high output voltage at low current drain.

In one specific embodiment producing a single phase output signal of 115 volts at 35 volt amperes and 400 c.p.s., a three-phase output signal of 115 volts at 20 volt amperes and 400 c.p.s., and a D.C. output signal of 200 volts and 75 ma., and which is not to be considered limiting in scope, the static converter components comprised:

Chart 1

Transistors:
```
    30 _____ 2N188A
    32, 70 _____ 2N188A
    90, 102, 104, 140, 140′, 140″ ___ 2N188A
    110, 112, 180 _____ 2N275
    160, 160′, 160″, 162, 162′, 162″  2N540
```
Resistors:
```
    45 _____ohms__   330
    48, 50 _____do____   4.7K
    52 _____ do____   820
    56, 58, 146, 146′, 146″ ___do____   10
    60 _____ do____   68K
    62, 134 _____ do____   22K
    76, 82, 148″ _____ do____   150
    78 _____  do____   27K
    82 _____  do____   150K
    94 _____  do____   56K
    96 _____  do____   33K
    98 _____  do____   1K
    116 _____  do____   0.5
    126, 128 _____  do____   3.9K
    130 _____   do____   1.5K
    144, 144″ _____  do____   39K
    144′ _____  do____   47K
    148 _____   do____   220
    148″ _____   do____   270
    166, 166′, 166″ _____   do____   1
```

Chart 1—Continued

Resistors—Continued
- 184 ............ohms... 700
- 186 ............do.... 33
- 190 ............do.... 2
- 206 ............do.... 300

Capacitors:
- 34, 36, 40, 84, 150, 150', 150'' ...μf... 0.25
- 68, 188 ...μf... 25
- 80 ...μf... 10
- 72, 138, 138', 138'' ...μf... 0.06
- 100 ...μf... 0.02
- 118, 120 ...μf... 0.005
- 122 ...μf... 0.1
- 132, 136, 170, 170', 170'', 204 ...μf... 0.1
- 168, 168', 168'' ...μf... 0.002
- 192 ...μf... 100
- 208, 210 ...μf... 20

Diodes:
- 44 ............ SV-810
- 196, 198, 200, 202 ............ 2N1084

In certain modifications in which a constant output is essential, the inverter will include signal derivation means for deriving a signal representative of the output voltage, and rectifying same for comparison with a reference voltage derived from a Zener type diode. The error signal thus determined is fed back over emitter resistors 148, 148', 148'' and 98 to the preamplifiers for the various stages. The automatic gain control voltage thus provided will effect the stabilization of the signal output in an economical manner without requiring the addition of complex, bulky components. In the event that weight and space requirements permit, magnetic impedance regulators may be coupled in the output circuits in the conventional manner. Direct current regulation may be provided by coupling transistor series regulation circuits to control the collector current of transistor 180, or alternatively in the output circuit following resistor 206.

In the use of the inverter with power gyro equipment the circuit may be modified to distort the output signal for and during the starting operation to provide a higher power output. The provision of an output waveform which is closer to a square wave minimizes the amount of heat dissipated within the output transistors, since the point of operation in an $I_cE_c$ diagram is passing across the load line much faster. As the gyro equipment gets up to speed the output current will drop to the rated value, and the waveform is returned to low distortion to prevent overheating of the associated equipment.

In one preferred modification of the device the transformers 164, 164', 164'' and 114 are connected to the emitters of the transistor in the power amplifiers 16, 16', etc., in order to increase the efficiency of the heat sink for the device. That is, in the illustrated arrangements the collectors of transistors 160, 162 are connected over the transformer 164, etc. Since the shells of the transistor are connected to their collectors automatically and have minus potential (minus of the battery source being grounded to the chassis), the transistors are normally insulated from the chassis by mica washers. In a novel embodiment, transformer 142 will include a first and a second secondary winding, the one winding being connected between the base and emitter electrodes of transistor 160 and the second winding being connected between the base and emitter electrode of transistor 162. The emitters of transistors 160, 162 are connected to opposite ends of the primary winding of transformer 164, the center tap of which is connected to positive potential. The collectors of the transistors 160, 162 are connected to negative potential. Manifestly in such arrangement, heat dissipation is effected more readily.

In a further modification switching thermistors are mounted close to the heating spots (collectors) to cause the interruption of the drive of the power stage if the junction temperatures approach the pre-established limits, whereby the danger of damaging the transistors due to overload of the output circuits or excessive ambient temperatures is substantially minimized. Thermistors are preferred in such arrangement in that automatic recovery occurs as the shell temperature drops, and thermistor devices do not produce radio interference or transient voltages across the power lines in the manner of known forms of mechanical circuit breakers.

Manifestly, temperature compensation may be provided for the different stages of the device in accordance with known and conventional practices.

The use of static devices alone in the novel circuit of the invention provides a static power inverter of extremely light weight and compact size, to thereby permit ease of portability and a more flexible application in various types of aircraft equipment. Further, the novel inverter is silent in operation, and has no moving parts whereby dependable operation, freedom from component breakdown, and high efficiency is experienced. Further, such unit operates reliably and dependably in environments of extreme shock and acceleration forces.

While a particular embodiment of the invention has been shown and described, it is apparent that modifications and alterations may be made, and it is intended in the appended claims to cover all such modifications and alterations as may fall within the true spirit and scope of the invention.

This application is a continuation of my copending application having Serial No. 790,564, filed February 2, 1959, now abandoned, which is assigned to the assignee of the present application.

What is claimed is:

1. A static power inverter unit for providing low distorted single phase and three-phase alternating current supply potentials from a direct-current low voltage potential source comprising input means for coupling the device to a low voltage, direct current potential source; a voltage regulator circuit connected to said input means operative to provide a constant direct-current potential supply, an oscillator circuit connected to said voltage regulator circuit operative to provide sine wave output signals, a buffer amplifier circuit coupled to said oscillator circuit to amplify the sine wave output signals of said oscillator circuit, a three-phase alternating current signal generating means including a phase shift network coupled to the output side of said buffer amplifier, a drive amplifier and a power amplifier for each of said phases coupled to said phase shift network, an output transformer for each phase, means for interconnecting the secondary windings of said output transformers, and output means connected to the junctions of said transformer connections to provide a three-phase output for associated equipment; a single phase alternating current generating means connected to said buffer amplifier circuit including a preamplifier, a drive amplifier, and a power amplifier connected to amplify the output of said buffer amplifier circuit, and output means connected to said power amplifier to provide a single phase output for associated equipment, whereby a common oscillator circuit provides substantially distortionless single-phase and three-phase alternating current signals independent of variations in the loads for each of said potential supplies.

2. A static power inverter unit for providing single phase and three-phase alternating current supply potentials from a direct current low voltage potential source comprising input means for coupling the device to a low voltage, direct current potential source; a voltage regulator circuit connected to said input means operative to provide a constant direct-current potential supply, an oscillator circuit connected to said voltage regulator circuit operative to provide sine wave output signals, a buffer amplifier circuit coupled to said oscillator circuit to amplify the sine wave output signals of said oscillator circuit, a three-phase alternating current signal generating means including a phase shift network coupled to the output side of said buffer amplifier; amplifier means for each of said phases coupled to said phase shift network, and output means for coupling the three phase signal output of said amplifier means to associated equipment; a single phase alternating current generating means coupled to said buffer amplifier circuit including means for deriving a signal therefrom, amplifier means connected to amplify the signal derived from said buffer amplifier circuit, and a second output means connected to said amplifier means to provide a single phase output for associated equipment, whereby a common oscillator circuit provides substantially distortionless single-phase and three-phase alternating current signals independent of variations in the loads for each of said potential supplies.

3. A static power inverter unit as set forth in claim 2 in which said oscillator circuit and each of said amplifiers comprise only solid state switching components, and said phase shift network comprises a plurality of resistance-capacitor circuits connected to provide three different phases from each sine wave signal input thereto.

4. A static power inverter unit for providing single phase and three-phase alternating current and high voltage direct current supply potentials from a direct current low voltage potential source comprising input means for coupling the device to a low voltage, direct current potential source; a voltage regulator circuit connected to said input means operative to provide a constant direct-current potential supply, a first oscillator circuit connected to said voltage regulator circuit operative to provide sine wave output signals, a buffer amplifier circuit coupled to said oscillator circuit to amplify the sine wave output signals of said oscillator circuit, a three-phase alternating current signal generating means including a phase shift network coupled to the output side of said buffer amplifier, amplifier means for each of said phases coupled to said phase shift network, and output means for coupling the three-phase signal output of said amplifier means to associated equipment; a single phase alternating current generating means connected to said buffer amplifier circuit including a plurality of amplifier stages connected to the output of said buffer amplifier means to provide a single phase output for associated equipment; and a square-wave oscillator circuit connected to said input means, rectifier means connected to said oscillator circuit to rectify the signal output thereof, filter means connected to filter the output of said rectifier means, and output means for coupling the direct current output of said filter means to associated equipment.

5. A static power inverter unit for providing alternating current output from a direct-current, low voltage potential source comprising input means for coupling the inverter unit to a low voltage, direct current potential source, a voltage regulator means connected to said input means operative to provide a constant-regulated, direct-current potential supply, oscillator means operative as energized to provide sine-wave output signals, means for connecting said oscillator means for energization by said constant value direct current potential provided by said voltage regulator means, a driver amplifier circuit, means for coupling said driver amplifier circuit to said oscillator means to amplify the output signals thereof, power amplifier means, means for connecting the power amplifier means to amplify the output signals of the driver amplifier circuit means, and an output circuit for coupling the amplified signal output of said power amplifier to associated equipment.

6. A static power inverter unit for providing alternating current output from a direct-current, low voltage potential source comprising input means for coupling the inverter unit to a low voltage, direct current potential source, oscillator means operative to provide sine-wave output signals, means for coupling said oscillator means to said input means for energization by said direct current potential, a driver amplifier circuit, means for connecting said driver amplifier circuit to amplify the output signals of said oscillator means, power amplifier means, means for connecting the power amplifier means to amplify the output signals of the driver amplifier circuit means, an output circuit for coupling the amplified signal output in said power amplifier to associated equipment, and a negative feedback circuit connected between said output circuit and said driver amplifier circuit to minimize distortion in the waveform of the signals in said output circuit.

7. A static power inverter unit for providing alternating current output from a direct-current, low voltage potential source comprising input means for coupling the inverter unit to a low voltage, direct current potential source, oscillator means operative to provide sine-wave output signals, coupling means for coupling said oscillator means to said input means for energization by said direct-current potential, a driver amplifier circuit including at least one semiconductor connected as an amplifier device to amplify the output signals of said oscillator means, power amplifier means including a pair of semiconductor members connected in a push-pull amplifier configuration, means for connecting said power amplifier means to amplify the output signals of the driver amplifier circuit means, and an output circuit for coupling the amplified signal output of said power amplifier to associated equipment.

8. An inverter unit as set forth in claim 7 in which said oscillator means includes a pair of semiconductor members and a plurality of high feedback resistors connected to the semiconductor of said oscillator means to provide temperature stabilization for the elements thereof, and in which coupling means includes voltage regulator means connected to said input means to provide a constant regulated potential to said oscillator means.

9. A static power inverter unit for providing alternating current output from a direct-current, low voltage potential source comprising input means for coupling the inverter unit to a low voltage, direct current potential source, oscillator means operative to provide sine wave output signals, means for connecting said oscillator means to said input means for energization by said direct current potential, isolation amplifier means coupled to said oscillator means to amplify the sine wave output signals of said oscillator means and to prevent changes in the load of subsequent stages from changing the operation of said oscillator means, a driver amplifier circuit, means for connecting said driver amplifier circuit to amplify the output signals of said oscillator means, power amplifier means, means for connecting the power amplifier means to amplify the output signals of the driver amplifier circuit means, and output circuit for coupling the amplified signal output in said power amplifier to associated equipment.

10. A static power inverter unit for providing single phase and three-phase alternating current and high voltage direct current supply potentials from a direct current, low voltage potential source comprising input means for coupling the device to a low voltage, direct current potential source; a first oscillator means connected to said voltage regulator circuit operative to provide sine wave output signals, a buffer amplifier circuit coupled to said oscillator means to amplify the sine wave output signals of said oscillator circuit, a three-phase alternating current signal generating means including a phase shift network coupled to the output side of said buffer amplifier, amplifier means for each of said phases coupled to said phase shift network, and output means for coupling the three-phase signal output of said amplifier means to associated equipment; and a single phase alternating current generating means connected to said buffer amplifier circuit including a plurality of amplifier stages connected to the output of said buffer amplifier means to provide a single phase output for associated equipment.

11. A static power inverter unit for providing three-phase alternating current output from a direct-current, low voltage potential source comprising input means for coupling the inverter unit to a low voltage, direct-current potential source, oscillator means operative to provide sine wave output signals, a three-phase alternating current signal generating means coupled to said oscillator means including a phase shift network, an output circuit for each of said phases comprising a driver amplifier circuit connected to the output circuit for its phase, power amplifier means connected to amplify the output signals of the driver amplifier circuit means, and an output circuit for coupling the amplified signal output of said power amplifier to associated equipment, the output circuits of the three phases providing a three phase alternating current supply for associated equipment.

References Cited in the file of this patent
UNITED STATES PATENTS
2,892,098    Bergvall _____ June 23, 1959